US006695556B2

(12) United States Patent
Addy

(10) Patent No.: US 6,695,556 B2
(45) Date of Patent: Feb. 24, 2004

(54) VEHICLE REAR DOOR TIE-DOWN KIT

(76) Inventor: Thomas Michael Addy, 1944 Felspar St., San Diego, CA (US) 92109

( * ) Notice: Subject to any disclaimer, the term of this patent is extended or adjusted under 35 U.S.C. 154(b) by 15 days.

(21) Appl. No.: 10/038,362

(22) Filed: Jan. 7, 2002

(65) Prior Publication Data

US 2003/0129038 A1 Jul. 10, 2003

(51) Int. Cl.$^7$ .................................................. B60P 7/08
(52) U.S. Cl. ............................. 410/97; 410/34; 410/35
(58) Field of Search ........................ 410/34, 35, 96, 410/97, 100; 224/403, 534, 327, 318, 324; 248/499

(56) References Cited

U.S. PATENT DOCUMENTS

| | | | |
|---|---|---|---|
| 2,372,967 A | * | 4/1945 | Martin |
| 4,007,862 A | | 2/1977 | Heftmann |
| 4,630,990 A | | 12/1986 | Whiting |
| 4,793,535 A | | 12/1988 | Johnson |
| 4,869,628 A | * | 9/1989 | Fletcher ..................... 410/100 |
| 4,957,400 A | | 9/1990 | Karp |
| 5,067,644 A | | 11/1991 | Coleman |
| 5,230,449 A | | 7/1993 | Collins et al. |
| 5,338,136 A | * | 8/1994 | Hetchler .................... 410/100 |
| 5,607,093 A | | 3/1997 | Geier |
| 5,769,291 A | | 6/1998 | Chasan |
| 5,800,106 A | * | 9/1998 | Miller ........................ 410/117 |
| 5,947,354 A | | 9/1999 | Williams |
| 6,065,915 A | * | 5/2000 | Ruehl et al. .................. 410/36 |
| 6,152,664 A | * | 11/2000 | Dew et al. .................. 410/100 |
| 6,210,087 B1 | * | 4/2001 | Bacon ......................... 410/35 |
| 6,273,654 B1 | * | 8/2001 | Whitaker .................... 410/116 |

* cited by examiner

*Primary Examiner*—Stephen T. Gordon
(74) *Attorney, Agent, or Firm*—Donn K. Harms

(57) ABSTRACT

A multi-purpose rear door tie down kit providing a plurality of components for securing elongated objects to the rear tailgate of a pickup truck or the rear hatch of a sport utility vehicle. The device in its simplest form features an elongated flexible cushioning member that attaches to the rear tailgate or cargo door. In other preferred embodiments it features a plurality of attachable components configured for removable attachment to the cushioning member which provide securement of articles being transported as well as storage of tools and components. The in a kit form to allow attachment of one or a combination of components configured for releasable attachment to the cushioning member component. The device can be easily stored behind the seat to be mounted onto the tailgate or rear door in seconds when an article needs to be secured. A variety of articles may be secured such as wood, surf boards, skis, ladders and bicycles just to name a few. Further, as a kit of interchangeable bag components, each configured for attachment to a cushioning member, the device allows for the pre configuration of tools or parts to be used upon a job site by the user prior to departure and easy attachment of bag components containing tools and/or parts to the cushioning member component.

20 Claims, 2 Drawing Sheets

VEHICLE REAR DOOR TIE-DOWN KIT

FIELD OF THE INVENTION

This invention relates to the field of automotive tie-downs providing a means to carry and restrain a variety of items to the tailgate or rear closure door of a pickup truck. The inventor has accomplished this by creating a unique truck Rear door Tie-down Kit comprised of several components and straps that attaches firmly to the tailgate of a pickup truck. The device will provisionally attach to the tailgate offering padded protection with a variety of strap tie-downs holding items like surfboards, skis or other objects that will hang over the tailgate or rear door of a sport utility vehicle, along with a bag that can hold both wet and dry articles. The kit will also come with a support bar and bicycle front fork mounting bracket. The device will come in a variety of sizes depending upon the size of the tailgate and the quantity of items being transported.

BACKGROUND OF THE INVENTION

There are a large number of small to medium sized pickup trucks used to transport recreational equipment like surf boards, skis or bicycles by their owners. Sometimes it is necessary to transport items like wood or ladders that are too long for the bed of the truck and there is no adequate means to tie them down or keep them from sliding out, or scratching the tailgate or the rear door of a sport utility vehicle. Some owners of these pickup trucks use them for other purposes or just would like to keep them in stock pristine condition, without adding permanent tie-down fasteners to the truck bed. Usually it is just a spur-of-the-moment trip to the beach with the surfboard when problems arise and a less than adequate means of attachment is used to tie down these articles and they come off on the freeways. This inventor has devised a new, unique Rear door Tie-down Kit that is a versatile means of tie-down, cushion and storage combination that can easily be kept behind the seat to be attached quickly and easily to the tailgate of the truck when needed and comes in a variety of lengths. The tailgate is the only area on a stock pickup truck or sport utility vehicle where straps can easily wrap around and hold firmly. Many temporary tie-down attachments in the past have been fixed to the gutter above the doors, but in the newer vehicles this area does not exist, and when it was used it would usually cause some damage to the paint in those areas. Another conveyance of this kit is a Carryall Bag that can hold wet and dry articles, and keep them separated. The compactness and versatility of this kit, along with its relative low cost of manufacturing, make it a very desirable item to be carried behind the seat of many pickup trucks. U.S. Pat. No. 4,007,826 of Rex Walter Heftmann, (the '826 patent) describes a detachable car-rack adapted to support a surfboard or similar elongated object atop a car mounting surface such as a roof. The '826 patent relies on the gutter of the vehicle for holding to the roof for support. The hooks used exert a concentrated pressure in the area of the gutter where they are attached and can damage the paint. The '826 patent has no similarities to the truck Rear door Tie-down Kit herein described.

U.S. Pat. No. 4,630,990 of Whiting Montague, (the '990 patent) discloses a device for loading and transporting elongated objects on vehicle rooftops. The '990 patent describes a large and complicated support metal structure capable of carrying very heavy loads, but not one that would easily be stored, especially behind the front seat. Thus the '990 patent does not conflict with the patent herein described.

U.S. Pat. No. 4,793,535 of Donald Johnson, (the '535 patent) tells of a sack for carrying and transporting a surfboard which may be used in its first form as a backpack carrier for the surfboard, and in its second form as a roof-rack for transporting the surfboard by a vehicle. The '535 patent has the unique feature of being a sack for carrying a surf board, but uses the rain gutter of the vehicle for its attachment means to the roof area and does not have the versatility for holding other items like bicycles and the like to the vehicle.

U.S. Pat. No. 4,957,400 of John D. K. Karp, (the '400 patent) teaches of a set of pickup truck protective pads for carrying long loads that is comprised of a cab pad and a tailgate pad. Each pad has a hold down strap and clips on either side to secure it to the truck. This device again uses the rain gutter as a holding means on the cab, but does have similarities in using a strap to hold in the tailgate area. The straps in the '400 patent hold to the tailgate latching mechanism, not wrapping around the tailgate, and the device does not have the versatility herein described.

U.S. Pat. No. 5,067,644 of Robert A. Coleman, (the '644 patent) is comprised of a guard for racks that are used on cars and the like. The '644 patent shows primarily a cushion to protect both the rack and the item or items being transported. This device could not be adapted to the tailgate and is not designed for any versatility of the items involved.

U.S. Pat. No. 5,230,449 of John G. Collins, (the '449 patent) describes a collapsible bicycle carrier which utilizes the structure of the bicycle frame for its support and easily adaptable to virtually any vehicle. The '449 patent is primarily a set of straps and a cushion where the peddle presses against the vehicles. Though this apparatus could be used to hold a bicycle to the tailgate of a pickup truck, it would do little for holding or cushioning anything else, such as a ladder or surfboard.

U.S. Pat. No. 5,607,093 of William F. Geier, (the '093 patent) tells of a carrier device for supporting and securing different objects to a luggage rack of a vehicle or directly to the roof of a vehicle that does not have a luggage rack. This is another patent that is specifically designed to hold items to the roof of vehicles by using an existing roof rack and attaching to the gutters above the windows. The '093 patent has no means to attach to the tailgate of a pickup truck and has no versatility in the articles it will hold.

U.S. Pat. No. 5,769,291 of Paul E. Casan, (the '291 patent) It is the object of the '291 invention to provide a new and improved support pad assembly for supporting elongated objects such as skis or surfboards on a vehicle roof. The '291 patent is still another design that uses the existing roof rack on vehicles or other means of attachment to the roof area. The '291 patent is a design to restrain and cushion items on the roof of vehicles with limited versatility.

U.S. Pat. No. 5,947,354 of Patrick Velverton Williams, (the '354 patent) describes an inflatable roof carrier for supporting a load on the roof of a vehicle. This device does not rely on the gutters, but it straps through the doors to be attached to itself on the inside of the vehicle. The '354 patent only offers a cushion for the roof with minimal attachment points, not being adaptable for attaching to the tailgate or holding bicycles.

None of the foregoing prior art teaches or suggests the particular tie-down capabilities or versatility this unique Rear door Tie-down Kit provides. Thus, there is a continuing need for a light, compact kit that can be stored behind the seat of a pickup truck, and can be attached to the tailgate, restraining a variety of articles.

SUMMARY OF THE INVENTION

The present invention accomplishes its desired objects by providing a versatile new and improved Rear door Tie-down Kit to be attached to the tailgate of a pickup truck or over the top of a sport utility vehicle being used for hauling. The kit is comprised of a padded cushioning member that covers the upper edge of the tailgate of the truck. This cushioning member may vary in length and width, depending upon the size of the truck and the quantity or size of the articles being transported. The cushioning member has a flat surface that engages with the top edge of the tailgate, and an outside cushioning member flap and an inside cushioning member flap, that translate down the inside and outside of the pickup truck tailgate. A horizontal tie-down strap is fixably attached, preferably by sewing to the top edge, and translating the length of the cushioning member to both distal ends with locking rings on one side, and an elongated end on the other. It must be understood that though the conventional locking rings are indicated at several locations in this patent, many forms of strap fasteners exist and all will be covered within the scope of this patent.

On the distal ends of the cushioning member are the vertical mounting straps that are fixably attached on the top edge and cross diagonally over the horizontal tie-down strap running the length of the cushioned member. These vertical mounting straps wrap around the tailgate of the pickup truck and by crossing diagonally over the top of the horizontal tie-down strap, the stresses are born by the vertical mounting straps and not the sewing of the horizontal strap. After passing around the tailgate or vehicle rear fold down door, vertical mounting straps are securely tightened and locked with the locking rings.

A plurality of cooperatively engageable fasteners such as clip fastener straps are attached under the horizontal tie-down strap along the length of the cushioning member. All the straps that hold the clip fasteners are best sewn doubled to form a common cavity to accommodate the optional bicycle-holding bar. The bicycle-holding bar has a plurality of orifices for attaching commercially available bicycle front fork mounting brackets. Each bracket holds a single bicycle and one or more brackets can be attached, depending upon the length of the cushioning member. The bicycle holding bar will also be further restrained by going under the vertical mounting straps on each end of the cushioning member.

An additional embodiment of the Rear door Tie-down Kit will be a unique Carryall Bag that attaches to the plurality of clip fasteners along the length of the cushioning member. The Carryall Bag may be constructed completely of a porous nylon mesh or in a preferred embodiment, having the bag portion constructed of a water proof material with a nylon mesh pouch on the side, with a flap opening to be secured by a hook-loop fastening material. The Carryall Bag will have a pair of handles to be used when the bag is not attached to the clip fasteners on the cushioning member. One or more of the Carryall Bags can be attached to the device depending upon the length of the cushioning member and the size of the bag(s).

A primary object of this invention is to create a means of restraining an elongated object such as a surfboard, skis, lumber, or a ladder, to the tailgate or rear door of a pickup truck or sport utility vehicle.

A further object of this invention is the provision of an easily mountable base support component that will cooperatively engage with a plurality of storage and securement components to allow a pre configuration prior to departure.

Another object of the invention is to create a means of tying down one or more bicycles to the tailgate of a pickup truck.

An additional object of the invention is to create a means to hold loose articles both wet and dry, in the back of a pickup truck.

A still another object of the invention is to protect the surface of the truck or vehicle and the article being transported.

A further object of this invention is to create a unique Tailgate Tie-down Kit small enough to be carried in a small bag behind the seat of a pickup truck and that will incorporate the many tie-down features herein disclosed.

These together with other objects and advantages which will become subsequently apparent and reside in the details of the construction and operation as more fully hereinafter described and claimed, reference being had to the accompanying drawings forming a part hereof, wherein like numerals refer to like parts throughout.

BRIEF DESCRIPTION OF THE DRAWING FIGURES

The accompanying drawings, which are incorporated in and form a part of this specification, illustrate embodiments of the invention and together with the description, serve to explain the principles of the invention.

DETAILED DESCRIPTION OF THE PREFERRED EMBODIMENTS

Figure 1:
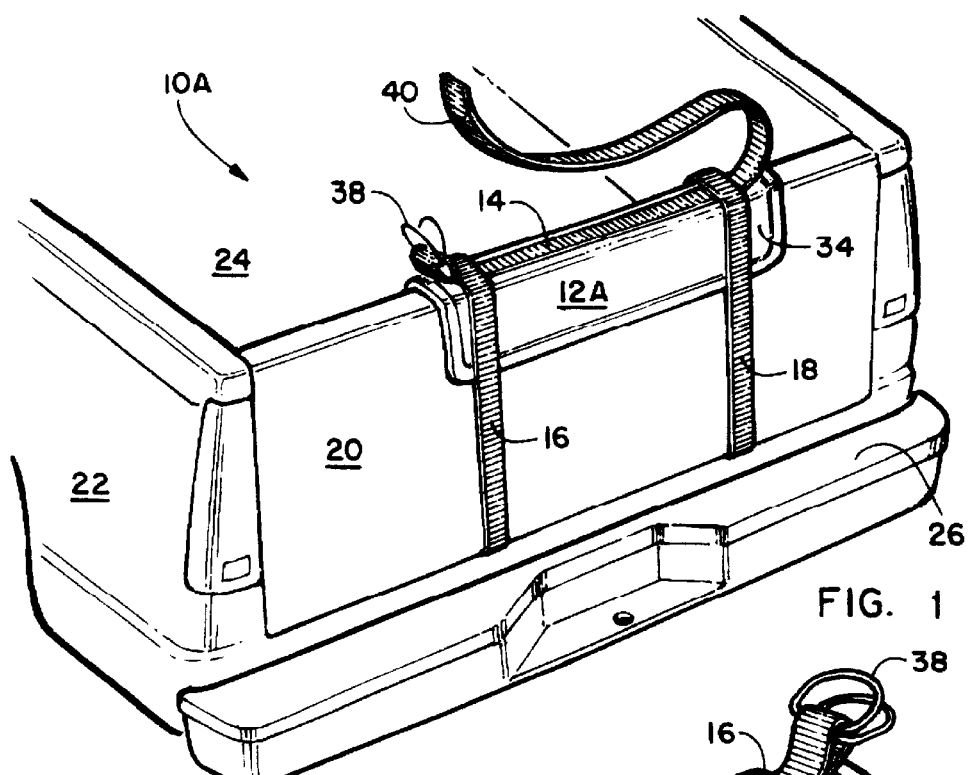
FIG. 1 depicts a perspective view of the back of a pickup truck with the base component of the tailgate tie-down kit attached.

Referring now to drawing FIG. 1 showing a perspective view of the rear door tie-down kit 10A. The device as depicted features a cushioning member 12, the horizontal tie down strap 14 and the two vertical mounting straps 16 and 18. The rear door tie-down kit 10A is attached to the tailgate 20 of a pickup truck or in similar applications the rear door of a sport utility vehicle which would be depicted essentially the same. The tailgate 20 closes off the rear area or bed 24 of the pickup truck 22 or in the case of a sport utility vehicle the cargo area. The back bumper 26 just below the bottom of the tailgate 20. In the simplest preferred embodiment of the device herein disclosed, the cushioning member 12 would provide an easily stored mount for lumber, surfboards, ladders, or other elongated material in the bed of a truck. Such elongated items would be secured to the cushioning member 12 which in turn is secured to the tailgate of the truck or fold down rear door of a vehicle and thereby provide a means to secure the carried item from movement caused by bumps and turns.

Figure 2:
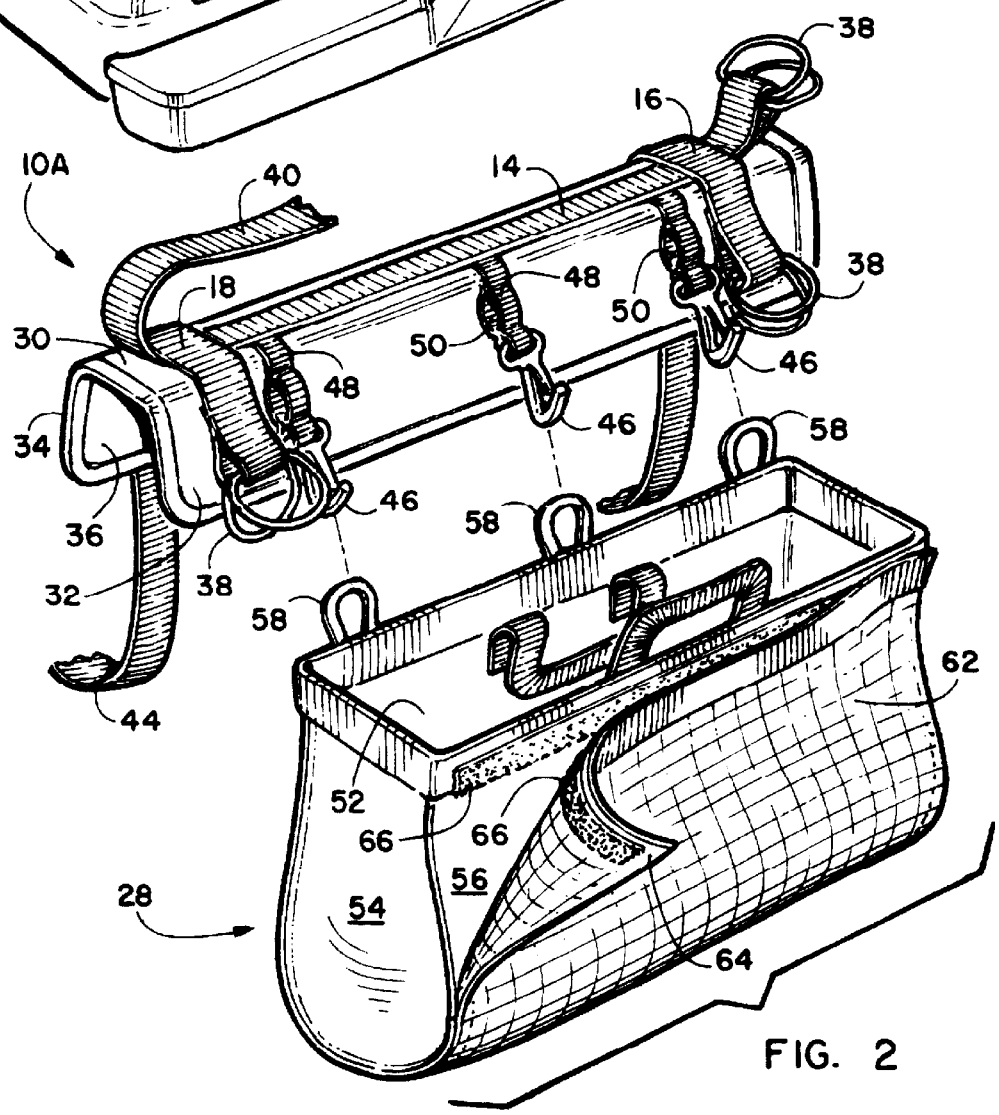
FIG. 2 depicts a perspective view of the tailgate tie-down kit depicted from the inside of the pickup truck bed with a cooperatively engageable bag easily attachable thereto.

FIG. 2 depicts a perspective view from the inside of the pickup truck 22, looking from the truck bed 24 out, showing the rear door tie-down kit 10A with the unique carryall bag 28 exploded away. In this embodiment the cushioning member 12 may be configured in varying lengths with a top flat surface 30, an inside surface 32 and an outside surface 34. The cushioning member 12 may be constructed of several types of conventional heavy-duty fabric materials, such as nylon or canvas with the inner surfaces 36 of a non-abrasive material to protect the surface of the vehicle to which it attaches. The cushioning member in the current best mode should be filled with a foam or matting cushioning material (not shown) between the two layers of fabric with a first forming the inner surface 36 and a second layer forming the outside surface 34 communicating with the top flat surface 30 and the inside surface 32. However the device could be formed in a single layer, and even when formed as a single layer having one side being the inner surface 36 and the opposite side forming the upper surface having an inside surface 32 communicating with the top flat surface 30 which communicates with the outside surface, without such cushioning material, the device provides a major improvement in protection of the vehicle from damage.

A horizontal tie-down strap 14 is fixably attached to the flat surface 30, preferably by sewing however other means of attachment such as rivets or heat sealing might also be used. A means of attachment of the distal end of the horizontal tie-down strap 14 to the cushioning member 12 is provided by a pair of locking rings 38 attached to the cushioning member 12. The tie down strap 14 is of sufficient length such that the distal end 40 extends around the item to be carried by the device and to be tightened and secured by threading through locking rings 38 thereby providing a means for tightening the tie down strap 14 over items such as lumber or ladders supported on the top flat surface 30 of the cushioning member 12 which lines up with the top edge of the tailgate 20. An alternate means of tightening the tie down strap 14 over the item so carried would be to use elastic material to form the tie down strap 14. Though the locking rings 38 have been displayed it must be understood by those skilled in the art that any form of commercially available strap locking device will be covered in the scope of this patent.

On one of the inside surface 32 or outside surface 34 or inner surface 36 of the cushioning member 12 two vertical mounting straps 16 and 18 are attached substantially normal to the direction of the horizontal tie down strap 14 and have a means to secure the distal ends of said mounting straps 16 and 18 to the opposite side of the cushioning member 12 in the form of locking rings 38 adjacent attached to or communicating with the cushioning member 12. The elongated mounting straps 44 need to be of sufficient length such that they translate around the tailgate 20 of pickup truck 22 or a sport utility vehicle and may be secured with locking rings 38 or other means of attachment of the distal ends of mounting straps 44 to the cushioning member 12 sufficiently tight to hold it in position in frictional engagement on the tailgate 20. These vertical mounting straps 44 cross diagonally over the horizontal tie-down strap 14 in the current best mode to define a cargo holding area 15 on horizontal tie-down strap between the two vertical mounting straps 44 by preventing the ends of the horizontal tie-down at their attachment points to the cushioning member 12 from moving inward and also to relieve the stresses on the sewing. A plurality of mating fasteners such as clip fasteners 46 are attached to the cushioning member 12 by means of clip fastener straps 48 are sewn doubled over to form a cavity 50 in the current best mode.

In another preferred embodiment of the device, an attachable carryall bag 28 is provided and is comprised of the inner compartment area 52 with end panels 54 and side and bottom panel 56. The interior compartment 52 of the carryall Bag 28 will be constructed of a durable waterproof canvas, vinyl, or nylon material, or in some cases be made of a porous nylon. A means for securing the carryall bag 28 to the cushioning member 12 is provided by a plurality of bag loops 58 mounted in positions to correspond to the clip fasteners 46 on the cushioning member 12 and attached on the side of the carryall bag 28. This feature is especially helpful when used in a kit form where a plurality of such carryall bags 28 will removably mount to the cushioning member 12 and would allow the user to pre load the carryall bag 28 to be used on a job site and have other carryall bags 28 that could be individually loaded for different jobs or purposes that would easily mate to the cushioning member 12 when they are to be used. This allows a contractor or similar user to configure the carryall bag 28 for use at a later time for a specific purpose with tools and parts and components for the job and then be attached on the day of the job. Such a kit using a plurality of configurable carryall bags 28 would be especially helpful for employers with a number of employees so that the parts and tools for specific jobs can be configured ahead of time and then attached to the cushioning member 12 by attaching carryall bag 28 properly configured from a plurality of carryall bags 28 configured for attachment to the cushioning member 12. To provide easy transport once the carryall bag 28 is transported to the destination, two handles 60 are attached to the side wall 56 of the carryall bag 28 in the current best mode in the inner compartment 52 so they fold out of the way when not in use. Also in the best embodiment of the carryall bag 28 a side pouch 62 is attached to one or both sides of the carryall bag 28 with an opening flap 64 to be fixably closed with a hook-loop fastener 66 as a means of closure. The side pouches 62 will be constructed of a porous nylon material to hold wet articles.

Figure 3:
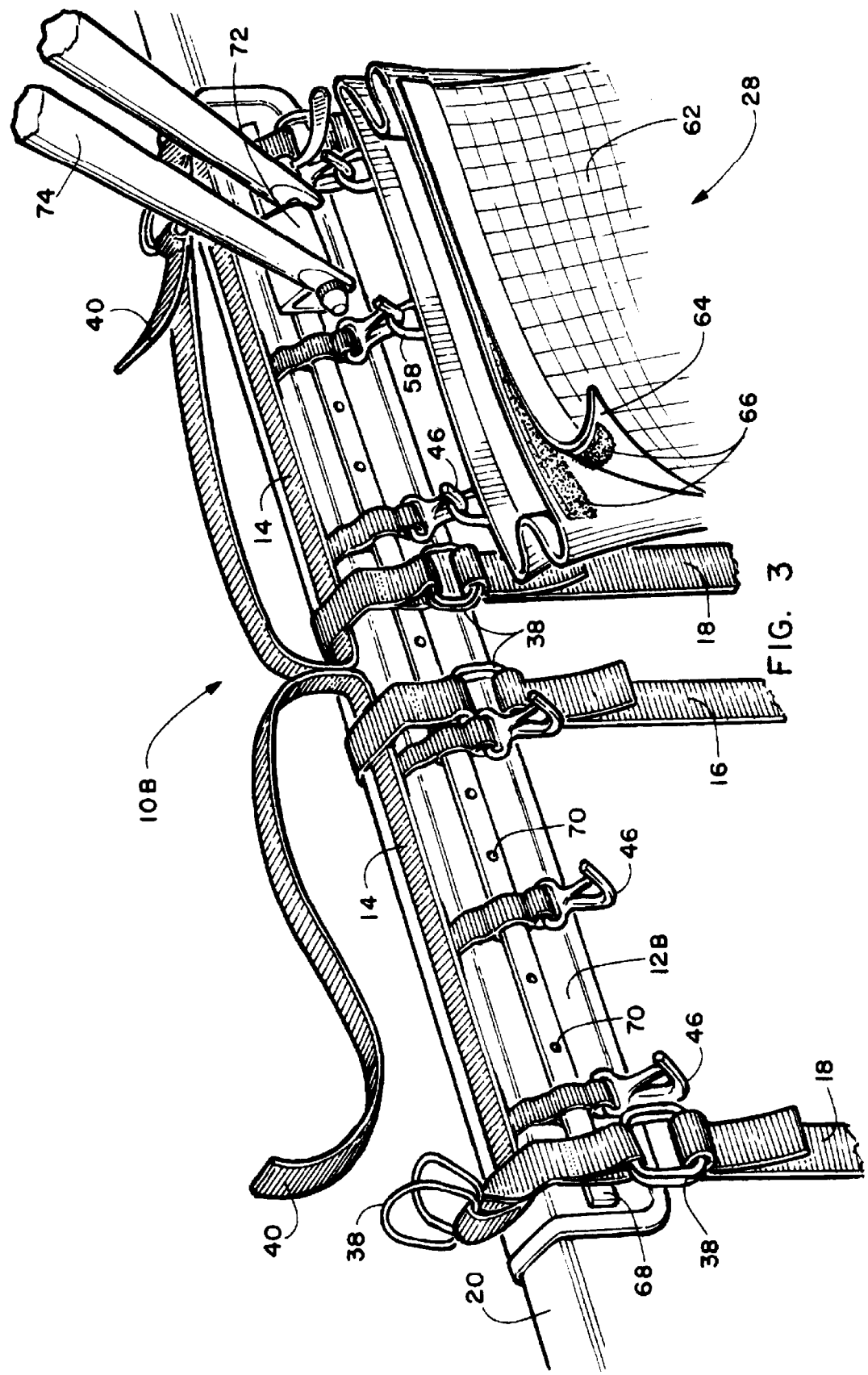
FIG. 3 is a perspective view from the inside of the pickup truck or sport utility vehicle of an elongated embodiment of the device with an optional bicycle holding-bar attached and the bicycle front fork mounting bracket, supporting the front forks of a bicycle. A Carryall Bag from a kit of cooperatively engageable bags is also shown in its attached position.

FIG. 3 depicts a perspective view from the inside of the pickup truck bed 24 showing another preferred embodiment of the disclosed device 10B having in an elongated version of the cushioning member 13. The elongated embodiment of the cushioning member 13 has been depicted extended to incorporate two horizontal tie-down straps 14 and four vertical mounting straps 16 and 18. This embodiment would be especially useful for surfboards, lumber or loads with a lot of elongated pieces. Also included is a bicycle holding-bar 68 which is positioned through the cavity's 50 formed in the clip fastener straps 48 to be held firmly under the mounting straps 16 and 18. There is a plurality of orifices 70 along the length of the bicycle holding-bar 68 providing a means to attach one or more bicycle front fork mounting brackets 72, shown holding the front forks of a bicycle 74. This embodiment could also be used with one or a plurality of carryall bags 28 in the aforementioned kit form allowing the user to carry both a bicycle 74 and a carryall bag 28 with parts or other items therein, all secured to the elongated cushioning member 13. As depicted, there is a plurality of means for attachment of a plurality of carryall bags 28 in this elongated embodiment thus allowing the user to attach one or a plurality of carryall bags 28 to the elongated cushioning member 13 each of which could be pre loaded with parts or tools or both for the job destination intended and then quickly attached for transport. In both embodiments, other carryall bags 28 could be included in the kit of to allow the user to pre load these carryall bags 28 such that when the truck returns to its starting point, the device may be easily reconfigured for the next job by simply removing the attached carryall bag 28 and substituting another that cooperatively engages with the cushioning member 13 or 12 and is pre-loaded for another destination. As is obvious to one skilled in the art, other devices might also be configured for cooperative engagement with the positioned clip fasteners 46 on the cushioning member 12 such as straps, nets, or similar restraining components, and such is anticipated. The current best mode however uses the carryall bag 28 and means for securing the carryall bag 28 to the cushioning members 12 and 13 provided by a plurality of bag loops 58 mounted in positions to correspond to the clip fasteners 46.

While the present invention has been described herein with reference to particular embodiments thereof, a latitude of modifications, various changes and substitutions are intended in the foregoing disclosure, and will be appreciated that in some instance some features of the invention will be employed without a corresponding use of other features without departing from the scope of the invention as set forth.

What is claimed is:

1. A vehicle rear door tie down apparatus for attachment to a tailgate for restraint of items being hauled in the cargo area of a truck or sport utility vehicle, comprising:

an elongated cushioning member of flexible material, said cushioning member having a top surface and a bottom surface, a first side edge and a second side edge, a first end edge and a second end edge opposite said first end edge;

at least one tie down strap, said tie down strap having an attachment end, and a distal end, said attachment end affixed to said cushioning member adjacent to said first side edge;

means of removable attachment of said distal end of said tie down strap to said elongated cushioning member to an attachment point adjacent to said second side edge;

at least one mounting strap, said mounting strap having a first end and a distal end opposite said first end, and having a determined length, said mounting strap attached at said first end to said cushioning member adjacent to said first-end edge;

means of removable attachment of said distal end of said mounting strap to a mounting point adjacent to said second end edge and with said mounting strap tightly engaged around the outside surface of a tailgate thereby frictionally engaging said bottom surface of said cushioning member to a substantially fixed position over a top edge of said tailgate;

said tie down strap being positioned to be in line with said top edge of said tailgate when said bottom surface is in said substantially fixed position; and whereby an item placed on said top surface of said cushioning member and supported by said tailgate is restrained thereon when said distal end of said tie down strap extends over said item and is attached to said elongated cushioning member at said attachment point.

2. The vehicle rear door tie down apparatus of claim 1 additionally comprising:

means to tighten said tie down strap to a tight frictional engagement with said item placed on said top surface.

3. The vehicle rear door tie down apparatus of claim 2 wherein said means to tighten said tie down strap to a tight frictional engagement with said item being placed on said top surface is a pair of rings mounted to said cushioning member at said attachment point, said distal end of said tie down strap being threadable through said pair of rings by pulling said distal end of said tie down strap.

4. The vehicle rear door tie down apparatus of claim 2 wherein said means to tighten said tie down strap to a tight frictional engagement with said item being placed on said top surface is provided by said tie down strap being made of elastic material.

5. The vehicle rear door tie down apparatus of claim 1 further comprising:

a plurality of cooperative fasteners attached to said cushioning member;

a bag, said bag having a plurality of mating fasteners in positions to correspond and attach to said plurality of cooperative fasteners; and said bag being removably attachable to said cushioning member.

6. The vehicle rear door tie down apparatus of claim 5 further comprising:

said bag from a kit of bags, each kit having a plurality of similarly configured bags, each bag having said plurality of mating fasteners thereon in positions to correspond and attach to said plurality of cooperative fasteners whereby any one of said bags from said kit of bags may be removably attached to said cushioning member.

7. The vehicle rear door tie down apparatus of claim 1 further comprising:

a plurality of tie down straps, each of said plurality of tie down straps having a first end and a distal end opposite said first end, and having a determined length, each of said plurality of said tie straps attached at said first end to said cushioning member;

each of said plurality of said tie down straps being positioned to be in line with said top edge of said tailgate when said bottom surface is in said substantially fixed position; and means of removable attachment of said distal ends of said tie down straps to said elongated cushioning member.

8. The vehicle rear door tie down apparatus of claim 7 additionally comprising:

means to tighten each of said plurality tie down straps to a tight frictional engagement with an item placed on said top surface of said cushioning member and under said tie down strap.

9. The vehicle rear door tie down apparatus of claim 7 further comprising:

a plurality of cooperative fasteners attached to said cushioning member;

at least one bag, said bag having a plurality of mating fasteners in positions to correspond and attach to said plurality of cooperative fasteners; and said bag being removably attachable to said cushioning member.

10. The vehicle rear door tie down apparatus of claim 9 further comprising:

said at least one bag from a kit of bags, each kit having a plurality of similarly configured bags, each bag having said plurality of mating fasteners thereon in positions to correspond and attach to said plurality of cooperative fasteners whereby any one of said bags from said kit of bags may be removably attached to said cushioning member.

11. The vehicle rear door tie down apparatus of claim 1 further comprising;

a bicycle fork mount attached to a mounting rod affixed to said top surface of said cushioning member; and said bicycle fork mount positioned inside the cargo area adjacent to said top edge of said tail gate when said cushioning member is folded thereover, whereby the front forks of a bicycle may be supported by said bicycle fork mount attached to said cushioning member for transport inside said cargo area.

12. The vehicle rear door tie down apparatus of claim 5 further comprising:

a bicycle fork mount attached to a mounting rod affixed to said top surface of said cushioning member; and said bicycle fork mount positioned inside the cargo area adjacent to said top edge of said tail gate when said cushioning member is folded thereover, whereby the front forks of a bicycle may be supported by said bicycle fork mount attached to said cushioning member for transport inside said cargo area.

13. The vehicle rear door tie down apparatus of claim 6 further comprising:

a bicycle fork mount attached to a mounting rod affixed to said top surface of said cushioning member; and said bicycle fork mount positioned inside the cargo area adjacent to said top edge of said tail gate when said cushioning member is folded thereover, whereby the front forks of a bicycle may be supported by said bicycle fork mount attached to said cushioning member for transport inside said cargo area.

14. The vehicle rear door tie down apparatus of claim 1 further comprising padding material sandwiched between said top surface and said bottom surface whereby said cushioning member provides padded protection to a surface of said tailgate.

15. A vehicle rear door tie down apparatus for attachment to a tailgate for restraint of items being hauled in the cargo area of a truck or sport utility vehicle, comprising:

an elongated cushioning member of flexible material, said cushioning member having a top surface and a bottom surface, a first side edge and a second side edge, a first end edge and a second end edge opposite said first end edge;

at least one tie down strap, said tie down strap having an attachment end, a second attachment location and a distal end extending from said second attachment location;

said attachment end affixed to said cushioning member adjacent to said first side edge and at said second attachment location;

said second attachment location of said tie down strap affixed to said cushioning member adjacent to said second side edge;

means of removable attachment of said distal end of said tie down strap to said elongated cushioning member to an attachment point adjacent to said first side edge;

a pair of mounting straps, each of said mounting straps having a first end and a distal end opposite said first end, and each mounting strap having a determined length;

a first of said pair of said mounting straps attached at its first end to said cushioning member adjacent to said first end edge and overlapping said tie down strap at a first overlap;

a second of said pair of mounting straps attached at its first end to said cushioning member adjacent to said second end edge and overlapping said tie down strap at a second overlap;

the area between said first overlap and said second overlap defining a cargo area;

means of removable attachment of said distal ends of said first of said pair and said second of said pair of mounting straps to a mounting point adjacent to said first end edge and said second edge respectively, with both of said pair of said mounting straps tightly engaged around an outside surface of a tailgate thereby frictionally engaging said bottom surface of said cushioning member to a substantially fixed position over a top edge of said tailgate;

said tie down strap being positioned to be in line with said top edge of said tailgate when said bottom surface is in said substantially fixed position; and whereby an item placed on said top surface of said cushioning member and supported by said tailgate is restrained thereon in said cargo area when said distal end of said tie down strap extends over said item and is attached to said elongated cushioning member at said attachment point.

16. The vehicle rear door tie down apparatus of claim 15 additionally comprising:

means to tighten said tie down strap to a tight frictional engagement with said item placed on said top surface.

17. The vehicle rear door tie down apparatus of claim 15 further comprising padding material sandwiched between said top surface and said bottom surface whereby said cushioning member provides padded protection to a surface of said tailgate.

18. The vehicle rear door tie down apparatus of claim 17 further comprising:

a plurality of cooperative fasteners attached to said cushioning member;

at least one bag, said bag having a plurality of mating fasteners in positions to correspond and attach to said plurality of cooperative fasteners; and said bag being removably attachable to said cushioning member.

19. The vehicle rear door tie down apparatus of claim 18 further comprising:

said at least one bag from a kit of bags, each kit having a plurality of similarly configured bags, each bag having said plurality of mating fasteners thereon in positions to correspond and attach to said plurality of cooperative fasteners whereby any one of said bags from said kit of bags may be removably attached to said cushioning member.

20. A vehicle rear door tie down apparatus for attachment to a tailgate for restraint of items being hauled in the cargo area of a truck or sport utility vehicle, comprising:

an elongated cushioning member of flexible material, said cushioning member having a top surface and a bottom surface, a first side edge and a second side edge, a first end edge and a second end edge opposite said first end edge;

a pair of tie down straps, each of said pair tie down straps having an attachment end, a second attachment location and a distal end extending from said second attachment location; and said attachment ends of both of said tie down straps affixed to said cushioning member at it respective said attachment end adjacent to a central portion of said elongated cushioning member and at said second attachment locations adjacent to said first and second side edges respectively;

means of removable attachment of said distal ends of said pair of tie down straps to said elongated cushioning member to an attachment point adjacent to said first side edge and said second side edge respectively;

two pair of mounting straps, each of said mounting straps having a first end and a distal end opposite its first end, and each mounting strap having a determined length;

a first strap of each of said two pair of said mounting straps attached at its first end to said cushioning member adjacent to a center section of said central portion of said elongated cushioning member and each first strap overlapping one of said tie down straps at a first overlap;

a second strap of each of said pair of mounting straps attached at its first end to said cushioning member adjacent to said first end edge and said second end edge respectively and each second strap overlapping one of said tie down straps at a second overlap;

the areas between said first overlap and said second overlap on each of said tie down straps defining a cargo area;

means of removable attachment of said distal ends of said two pair of mounting straps to mounting points on said elongated cushioning member, said mounting points positioned in line with said attachment end of each of said respective mounting straps, with both of said pair of said mounting straps tightly engaged around an outside surface of a tailgate thereby frictionally engaging said bottom surface of said cushioning member to a substantially fixed position over a top edge of said tailgate;

both of said pair of tie down straps being positioned to be in line with said top edge of said tailgate when said bottom surface is in said substantially fixed position; and whereby items placed on said top surface of said cushioning member and supported by said tailgate are restrained thereon in said cargo area when said distal ends of said tie down straps extend over said items and is attached to said elongated cushioning member at said attachment points.

* * * * *